US005607749A

United States Patent [19]

Strumor

[11] Patent Number: 5,607,749

[45] Date of Patent: Mar. 4, 1997

[54] ERGONOMIC KINETIC ACUPRESSURE MASSAGING SYSTEM

[76] Inventor: Mathew A. Strumor, 158 Key Heights Dr., Tavernier, Fla. 33070

[21] Appl. No.: 635,407

[22] Filed: Apr. 26, 1996

Related U.S. Application Data

[63] Continuation-in-part of Ser. No. 364,134, Dec. 27, 1994, abandoned.

[51] Int. Cl.[6] .......... B32B 3/00

[52] U.S. Cl. .......... 428/156; 428/141; 428/179; 428/188; 428/313.5; 5/724; 5/652.1; 297/DIG. 8; 601/148; 36/28; 36/29

[58] Field of Search .......... 428/85, 88, 141, 428/179, 156, 188, 313.5; 36/28, 29, 37, 71; 5/690, 724, 652.1, 944; 297/DIG. 8; 601/148, 149, 150, 156, 158

[56] References Cited

U.S. PATENT DOCUMENTS

| | | | |
|---|---|---|---|
| 3,681,797 | 8/1972 | Messner | 5/347 |
| 4,263,728 | 4/1981 | Frecentese | 36/129 |
| 4,342,158 | 8/1982 | McMahon et al. | 36/35 R |
| 4,521,979 | 6/1985 | Blaser | 36/29 |
| 4,680,876 | 7/1987 | Peng | 36/35 B |
| 4,776,109 | 10/1988 | Sacre | 36/3 B |
| 4,895,352 | 1/1990 | Stumpf | 267/80 |
| 5,035,068 | 7/1991 | Biasi | 36/3 R |
| 5,060,328 | 10/1991 | Larson | 5/450 |
| 5,175,946 | 1/1993 | Tsai | 36/29 |
| 5,253,377 | 10/1993 | Larson | 5/451 |
| 5,467,489 | 11/1995 | Cohen | 5/475 |

*Primary Examiner*—Patrick Ryan
*Assistant Examiner*—Marie R. Yamnitzky
*Attorney, Agent, or Firm*—Donald A. Kettlestrings

[57] ABSTRACT

An acupressure massaging system includes a platform having an upper surface, and includes an array of intersecting air channels extending therethrough in communication with space external of the pad. An array of spaced, independently flexible nipples extends from the upper surface of the platform, each nipple having an upper distal end and a flexible, accordion-pleated side wall comprised of material having elastic memory and defining an internal air-flow chamber. The air-flow chamber is in fluid communication with the air-flow channels and each nipple is structured and disposed for movement from a biased and normally extended position to a compressed position in response to contact with the skin or clothing of the user. The elastic memory of the nipples' side walls, created by the accordion-pleated side wall structure in cooperation with the elastic memory of the material of the side walls, normally urges the nipples to their extended positions to exert a kinetic counterforce on the skin or through clothing of the user providing an acupressure massaging and air-flow effect.

9 Claims, 8 Drawing Sheets

ERGONOMIC KINETIC ACUPRESSURE MASSAGING SYSTEM

CROSS REFERENCE TO RELATED APPLICATION

This application is a continuation-in-part of application Ser. No. 08/364,134, filed Dec. 27, 1994, for Ergonomic Acupressure Air-Flow Pad (now abandoned).

BACKGROUND OF THE INVENTION

The present invention relates to an acupressure massaging system, and more particularly to an acupressure ergonomic kinetic and massaging system having an array of normally extended compressible nipples adapted to acupressure massage and invigorate the user. Acupressure is defined as the application of pressure to parts of the human body. Ergonomics is defined as the study of the problems of people in adjusting to their environment; the science that seeks to adapt work or working conditions to suit the worker. Kinetic is defined as of or resulting from motion.

While it is recognized that sports and other highly active physical activities are often the cause of injuries, there is an increasing awareness that virtually any activity that involves a repetitious motion or contact of an object with the body may cause stress to the muscle and tendons, resulting in repetitive strain injury (RSI). Presently, injuries to the muscles and tendons are most commonly treated with physical therapy. Physical therapy encompasses a variety of modalities including massage, exercise, hydrotherapy, and ultrasound to name a few. Physical therapy, however, is concerned with the treatment of physical ailments, not the prevention of them. There is, therefore, a need to provide a means to prevent injuries, for instance those injuries resulting from repetitive strain, such as carpal tunnel and torsal tunnel syndrome.

Recently, the use of keyboards has been identified as a major contributing factor in repetitive .strain injuries to the hands and wrists. This is due to the fact that keyboards tend to force the upper body into unnatural positions, causing the hands to bend with the wrists cocked, resulting in straining of the tendons and muscles and reducing circulation. Although designers may reduce the incidence of repetitive stress injuries such as carpal tunnel syndrome through ergonomic considerations, experts expect that millions of workers per year will join the millions of workers around the world who have already been gripped by repetitive strain injuries.

The tragedy of repetitive strain injuries is that they are relatively easy to prevent but hard to cure. Doing warm-up exercises, maintaining good posture, keeping your arms loose, holding hands properly, stretching occasionally and taking frequent rest breaks all help to prevent injury. However, despite these simple preventive methods, many workers don't remember, or plainly ignore these guidelines. A need therefore exists for a device which helps prevent repetitive strain injuries, as well as other injuries, without requiring any additional action or preparatory rituals on the part of the user, other than going through the motions to perform the task at hand.

Accordingly, the present invention is directed to an ergonomic kinetic acupressure massaging system or material specifically structured to acupressure massage the user during and throughout a body motion, whether running, walking, typing, swinging an instrument such as a bat or golf club, or virtually any other motion required to perform an activity.

Numerous innovations for acupressure massaging materials have been provided in the prior art which are complex and expensive, for instance those found in the soles of athletic shoes. Even though these innovations may be suitable for the specific individual purposes to which they address, they differ significantly from the present invention, as hereinafter contrasted.

SUMMARY OF THE INVENTION

The present invention is directed to an acupressure massaging system having a platform with an upper surface, the platform including an array of air-flow channels extending therethrough and in fluid communication with space external of the pad; and an array of spaced independently flexible nipples extending from the upper surface of the platform, each nipple having an upper distal end and a flexible collapsible side wall structure surrounding an internal chamber. The air chamber of each nipple is disposed in fluid communication with all channels in the platform. Each nipple is adapted for movement from a normally relaxed extended position to a compressed position in response to a kinetic external force resulting from contact with the skin or clothing of the user. The nipples are further configured with accordion-pleated side walls to be biased towards the normally relaxed extended positions as a result of elastic memory of the material of the side walls and the accordion-pleated side wall structure so as to exert a counterforce on the skin or through the clothing of the user.

Accordingly, it is an object of the present invention to provide an inexpensive acupressure massaging member which can be incorporated within a wide range of products and which is specially structured to reduce the incidence of injuries to the muscles and tendons.

Still further, it is an object of the present invention to provide an acupressure massaging pad which includes an array of protruding nipples structured to provide a kinetic massaging force to a user upon contact and movement so that the constant acupressure massaging creates a stimulating effect.

In keeping with these objects, and with others which will become apparent hereinafter, one feature of the present invention resides, briefly stated, in the compressibility of each of the nipples, which can be compressed to approximately one third of its size, and the kinetic counter-active force exerted by each of the nipples as the nipples are constantly urged towards the extended state because of the elastic memory characteristic of the material of the side walls of the nipples acting in cooperation with the accordion-pleated structure of the side walls.

The novel features which are considered characteristics for the invention are set forth in appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWINGS

1. acupressure massaging system
2. nipple
4. platform 4A. upper surface of platform
6. air-flow holes
8. air-flow channels
10. distal end of nipple
12. wall of nipple
14. air-flow chamber
15. recess area
16. top open end of recess area
18. fabric on distal end of nipple
22. vertical axis
24. massaging movement
26. contacting surface
28. first horizontal directional movement of nipple
30. second horizontal directional movement of nipple
32. upward directional movement of nipple
34. downward directional movement of nipple
36. sport shoes or boots
38. inside lining
40. wrist wrap
41. wrist
42. keyboard
44. wheelchair
50. sleeve for knee brace or elbow brace with massaging comfort
52. limb
54. bending zone of sleeve
60. golf club handle
62. grip texture on distal ends of nipples
64. hands of user
100. acupressure massaging system
200. acupressure massaging system
300. acupressure massaging system

BRIEF DESCRIPTION OF THE DRAWINGS

For a fuller understanding of the nature of the present invention, reference should be had to the following detailed description taken in connection with the accompanying drawings in which.

Figure 1:
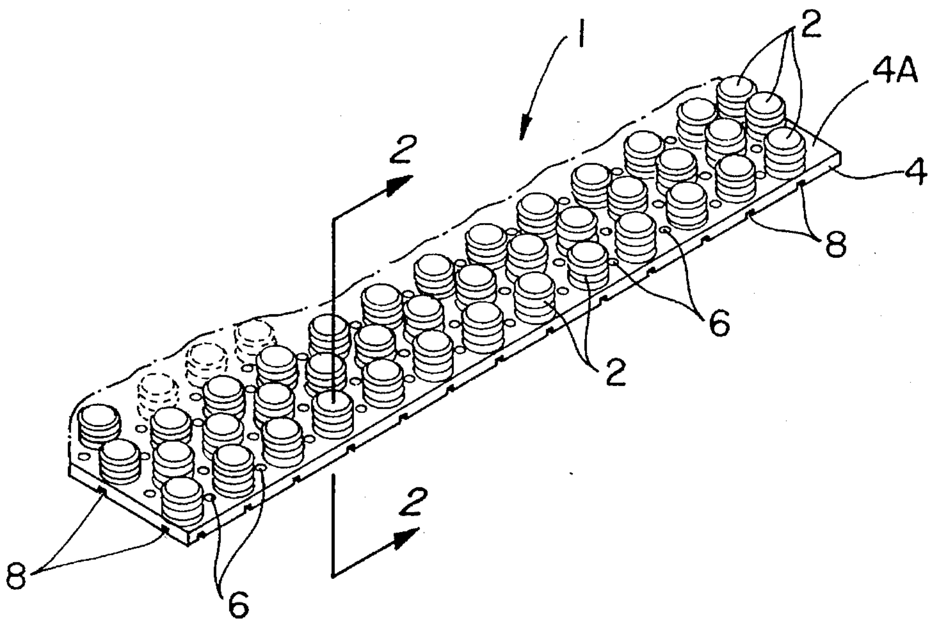
FIG. 1 is a partial perspective view of an acupressure massaging system constructed in accordance with a first preferred embodiment of the present invention.
Figure 2:
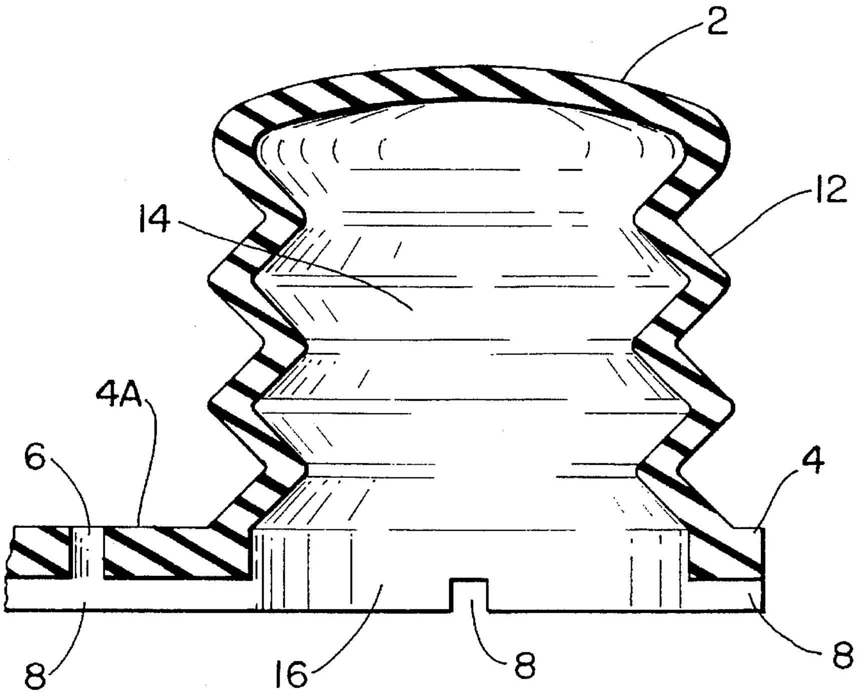
FIG. 2 is a cross-sectional view of a nipple taken along line 2—2 of FIG. 1.
Figure 7:
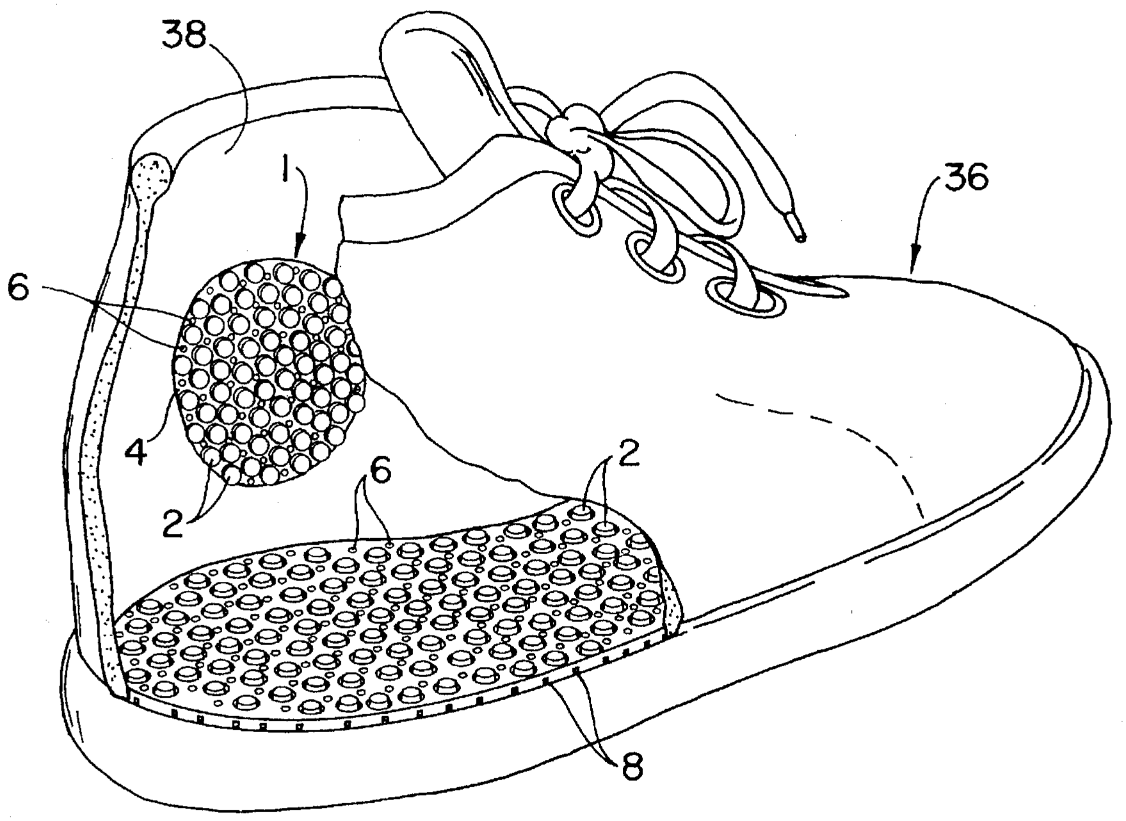
Figure 8:
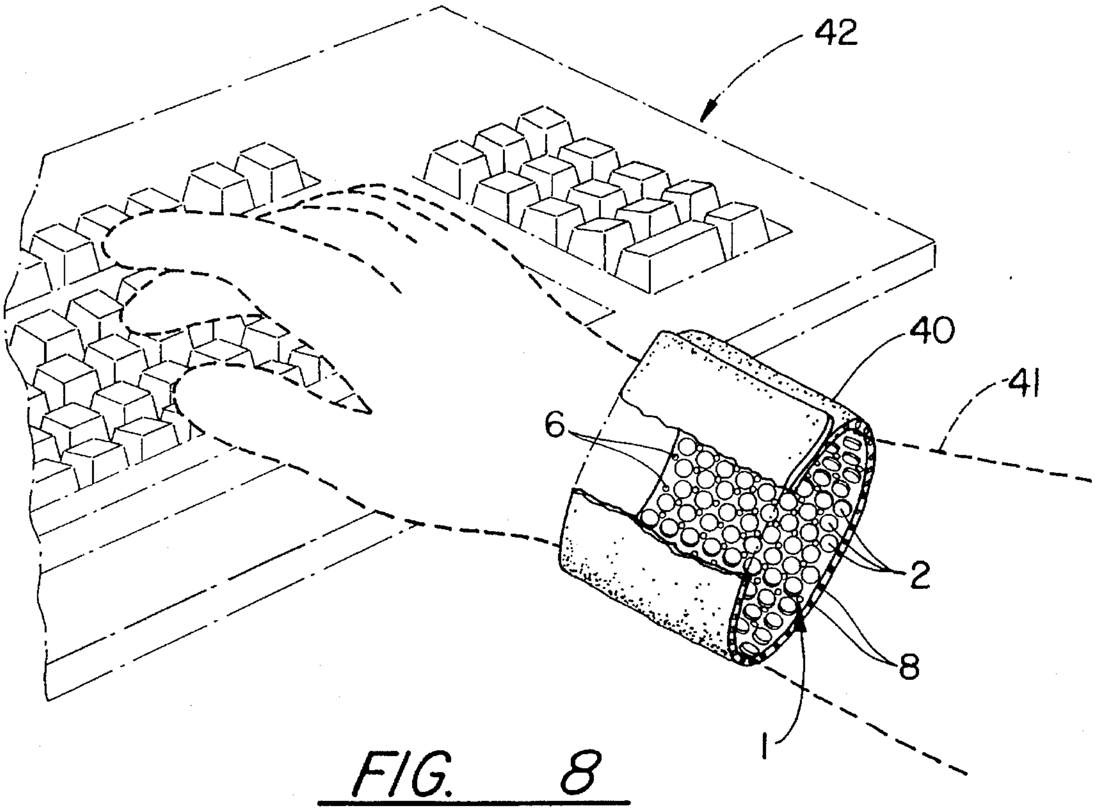
Figure 10:
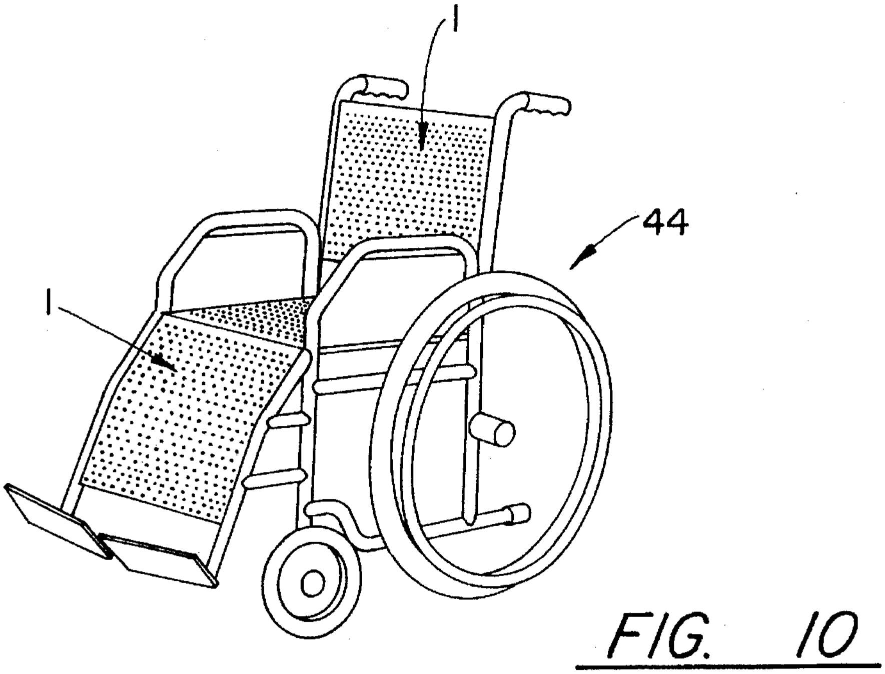
Figure 9A:
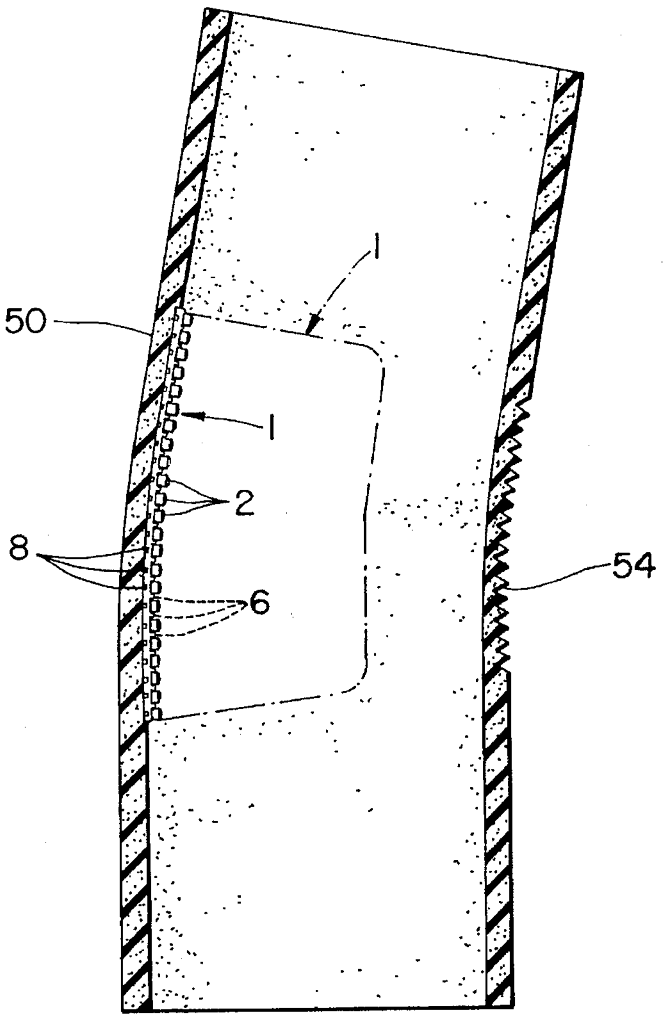
Figure 9B:
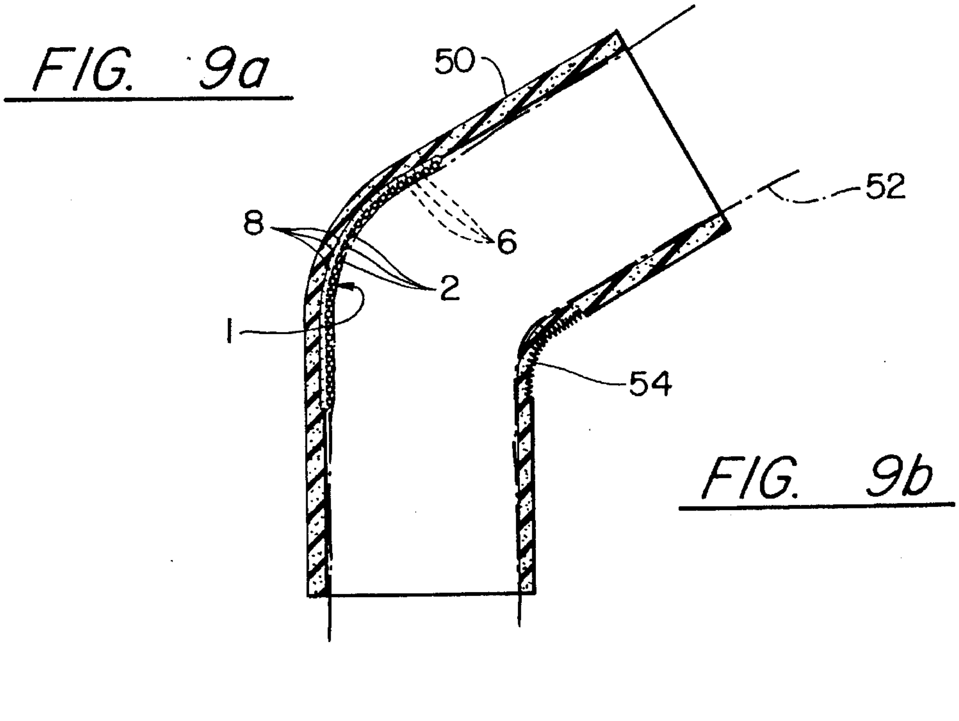
Figure 11:
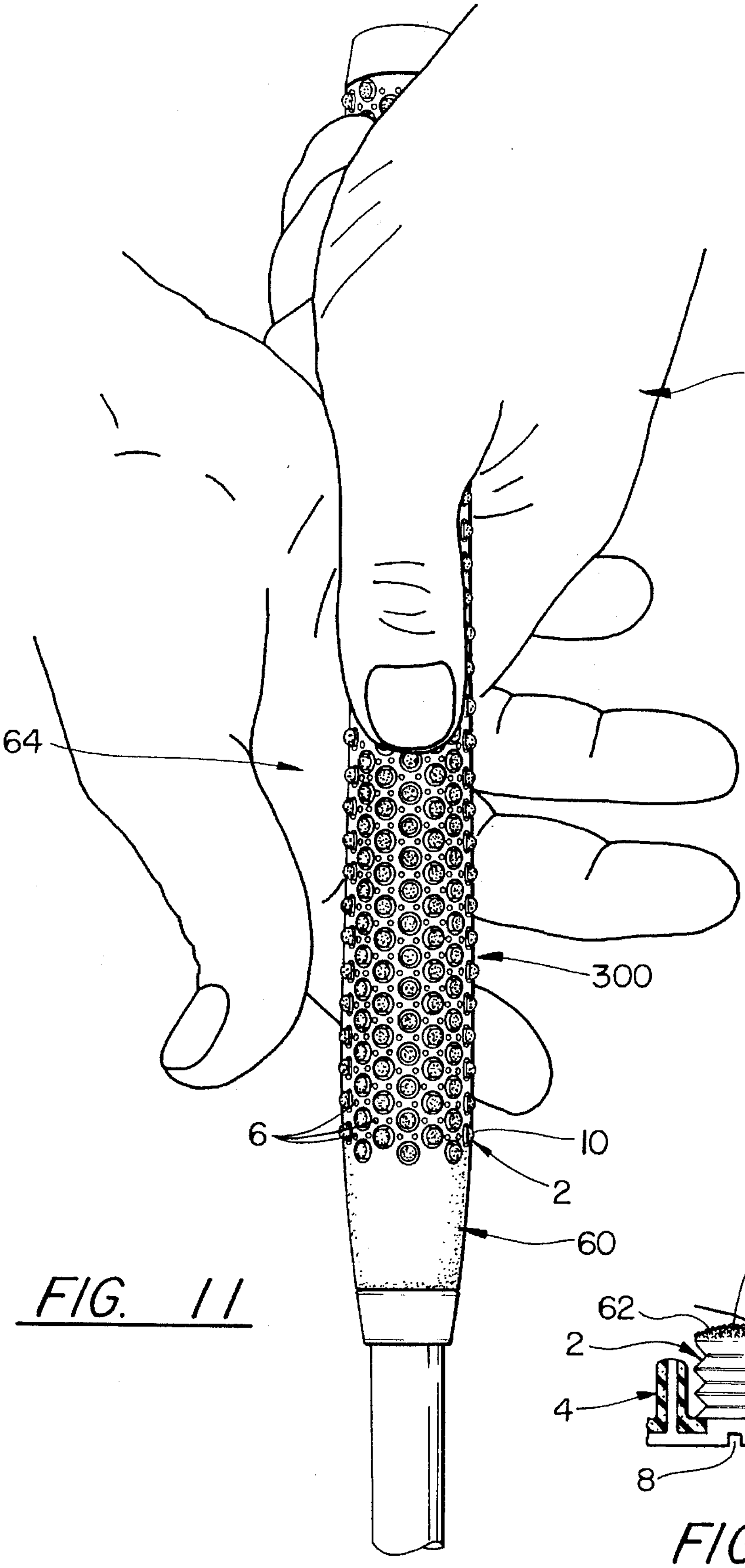
Figure 12:
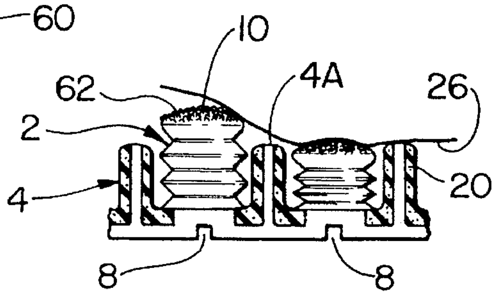
Figure 13:
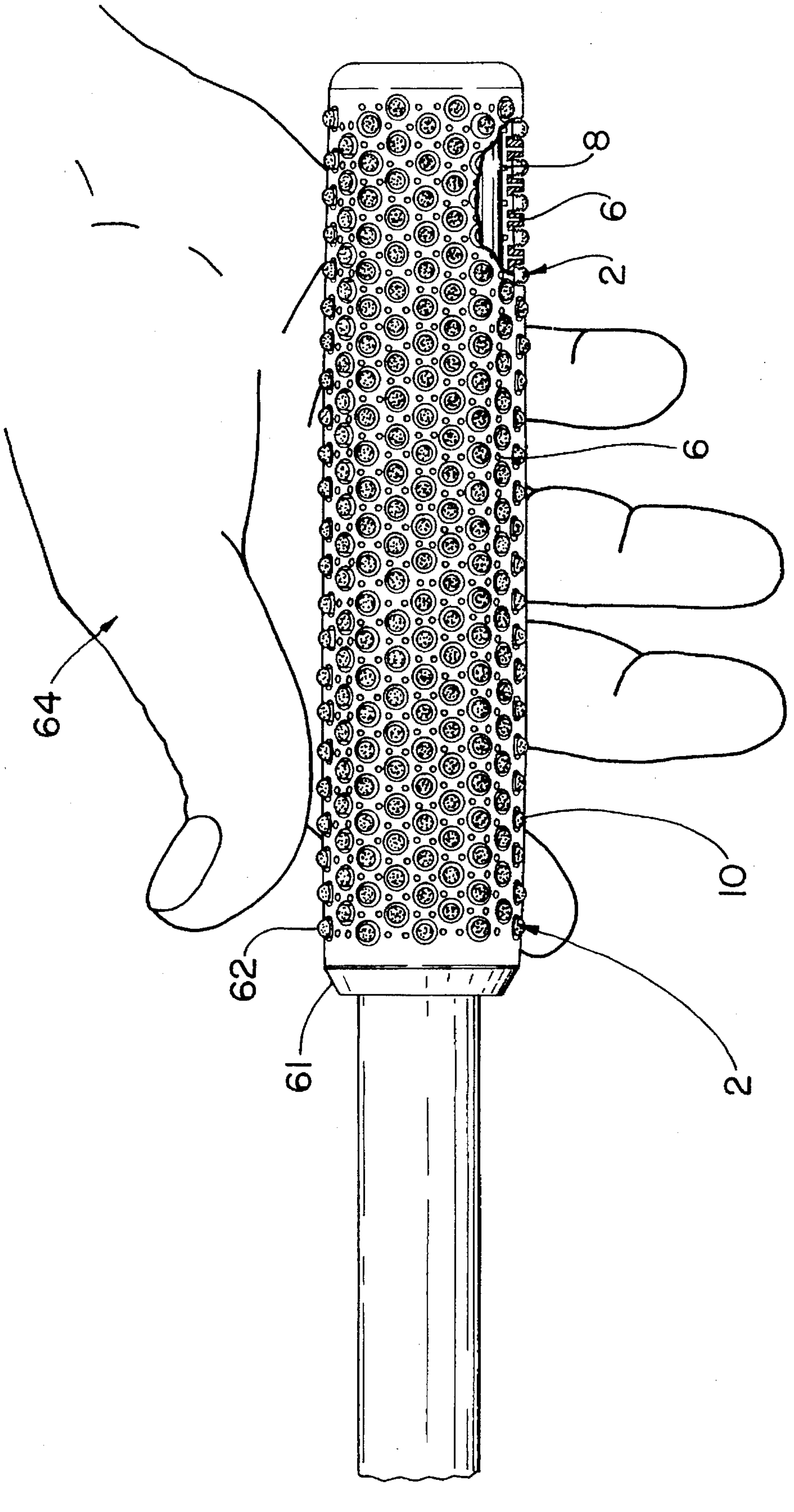

FIG. *6a* is a perspective view of the platform of FIG. 2 illustrating the full range of motion of the nipple;

FIGS. *6b* through *6e* are partial front elevational views of the platform of FIG. *6a* illustrating movement of the nipple in various directions;

FIG. 7 is a partial cutaway perspective view of the platform of FIG. 1 incorporated in a sport shoe or boot;

FIG. 8 is a perspective view of the platform if FIG. 1 incorporated into a wrist wrap;

FIG. *9a* is an elevational view of the platform of FIG. 1 incorporated into a sleeve;

FIG. *9b* is a view similar to that of *9a* illustrating the sleeve on a limb;

FIG. 10 is a perspective view of the platform of FIG. 1 incorporated in a wheelchair;

FIG. 11 is an elevational view of an acupressure massaging system constructed in accordance with a fourth preferred embodiment of the present invention illustrating the acupressure massaging system incorporated into a golf club handle;

FIG. 12 is a partial cross-sectional view of the acupressure massaging system of FIG. 11 showing the nipples massaging the user's hand while the air-flow exiting the air holes creates a tender touch; and FIG. 13 is an isolated elevational view of the acupressure massaging system of the embodiment of FIG. 11 shown on the handle of a garden tool or like instrument of the type having a shaft with a handle on the end.

DETAILED DESCRIPTION OF THE PREFERRED EMBODIMENTS

Figure 3:
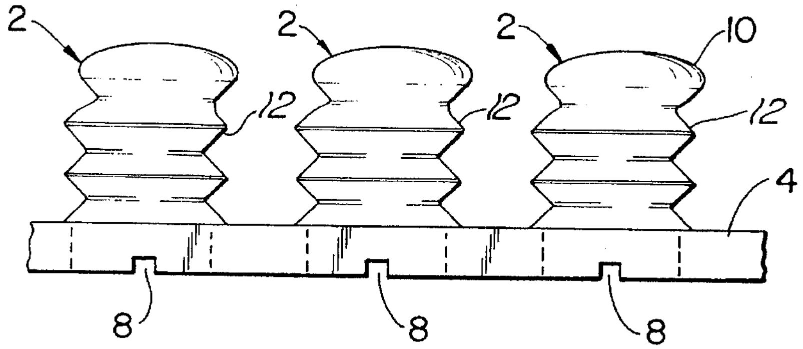
FIG. 3 is a partial front elevational view of the system of FIG. 1 illustrating the nipples in an extended position.

Referring to FIGS. 1–3, there is illustrated acupressure massaging system 1 constructed in accordance with a first embodiment of the present invention. Acupressure massaging system 1 includes an array of spaced flexible and collapsible nipples 2 extended vertically upwardly from an upper surface 4A of platform 4. As best seen in FIG. 2, a surrounding side wall 12 of nipple 2 is provided with an accordion-pleated construction to facilitate compression and circulation of air as will be explained in more detail. Side wall 12 is disposed in surrounding relation to an interior air chamber 14. Platform 4 further includes air channels 8 extending both transversely and longitudinally within the interior of platform 4. Air-flow holes 6 are formed through surface 4A of platform 4 and extend into air channels 8 in fluid air-flow communication therewith, creating air-flow throughout pad 1.

Referring to FIGS. *6a–6e*, each nipple 2 of pad 1 is structured and configured to move independently of the other nipples 2 in infinite directions with respect to a vertical axis 22 defined by the nipple 2 to provide a kinetic massaging motion 24. When placed in contact with a surface 26, for example a user, side wall 12 of each of nipples 2 compresses and moves in response to the kinetic force exerted by contacting surface 26 thereon. The movement of nipples 2 may be in horizontal directions 28, 30, in vertical directions 32, 34, or in a variety of combinations of the two. Compression and movement of nipples 2 is made possible by the flexible and collapsible accordion-pleated construction of side wall 12 along with the venting of air in and out of air chambers 14. This creates a recirculation or air-flow effect through air-flow channels 8 and air-flow holes 6 to prevent suction, and thus promotes free movement of nipples 2.

During contact with contacting surface 26, nipples 2 exert an acupressure massaging counterforce on contacting surface 26 as the biasing structure of side wall 12 urges nipples 2 toward the relaxed extended position. Nipples 2 are urged toward the normally relaxed extended position because of the memory characteristics of the material of side wall 12 acting in cooperation with the accordion-pleated structure of side wall 12. When the force of a contacting surface 26 is removed from a nipple 2, the shape and memory characteristics of side wall 12 returns nipples 2 to their normal extended position, as seen in FIG. 1.

The acupressure massaging system 1 of the present invention may be incorporated into a variety of products and shapes, wherein nipples 2 can apply therapeutic massaging pressure on the user during normal activity and use of the product and can also create an air-flow to produce a stimulating effect.

One example of such a use is shown in FIG. 7 wherein acupressure massaging system 1 is incorporated into lining 38 of a sport shoe or boot 36. Another example of a use of acupressure massaging system 1 is shown in FIG. 8 wherein acupressure massaging system 1 is fitted as part of the inner lining of a wrist wrap 40. Wrist wrap 40 is adapted to apply support and acupressure massaging air-flow to wrist 41 of a user while performing an activity, such as operating a keyboard 42.

A further example of the use of an acupressure massaging system 1 is shown in FIGS. *9a–9b* wherein acupressure massaging system 1 is incorporated into a sleeve 50 of a knee brace or elbow brace. Sleeve 50, including acupressure massaging system 1 on an inner surface, is dimensioned to be slid onto limb 52 of a user to provide massaging support and air circulation at the knee joint or elbow joint and surrounding muscles and tendons. Sleeve 50 may further be provided with an accordion-pleated bending zone 54 to promote bending at the knee or elbow.

Yet another example of a therapeutic use of acupressure massaging system 1 is shown in FIG. 10 wherein system 1 is secured to the seat surfaces of a wheelchair 44 so that each movement creates a massaging reaction and air circulation.

Figure 4:
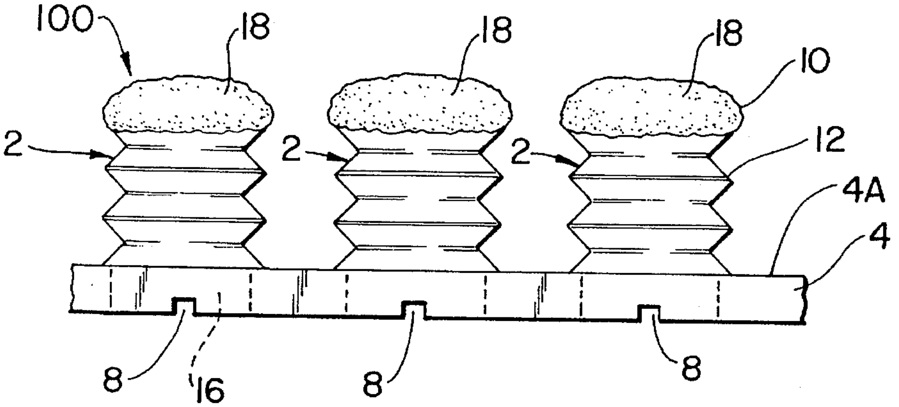
FIG. 4 is a partial front elevational view of an acupressure massaging system constructed in accordance with a second preferred embodiment of the present invention illustrating fabric on the distal ends of the nipples.

Acupressure massaging system 100 constructed in accordance with a second embodiment of the present invention is shown in FIG. 4. The acupressure massaging system 100 of this embodiment is very similar to that of acupressure massaging system 1 with the exception that acupressure massaging system 100 includes a fabric material 18 secured to the distal end of each nipple 2. Fabric material 18 is preferably water absorbent, soft to the touch and configured to provide additional comfort to a user while also providing the ability to absorb fluid, such as perspiration, as in a sweat band. It is contemplated that fabric material 18 may be color coordinated with surrounding surfaces of the product or device on which acupressure massaging system 100 is applied.

Figure 5:
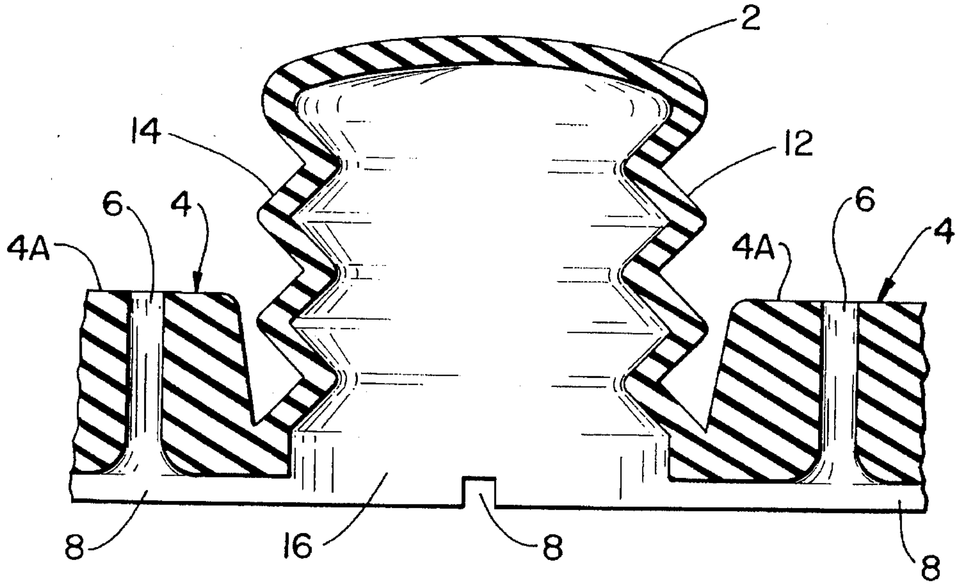
FIG. 5 is a cross-sectional view of an acupressure massaging system constructed in accordance with a third preferred embodiment of the present invention illustrating the nipples recessed in the platform.
Figure 6A:
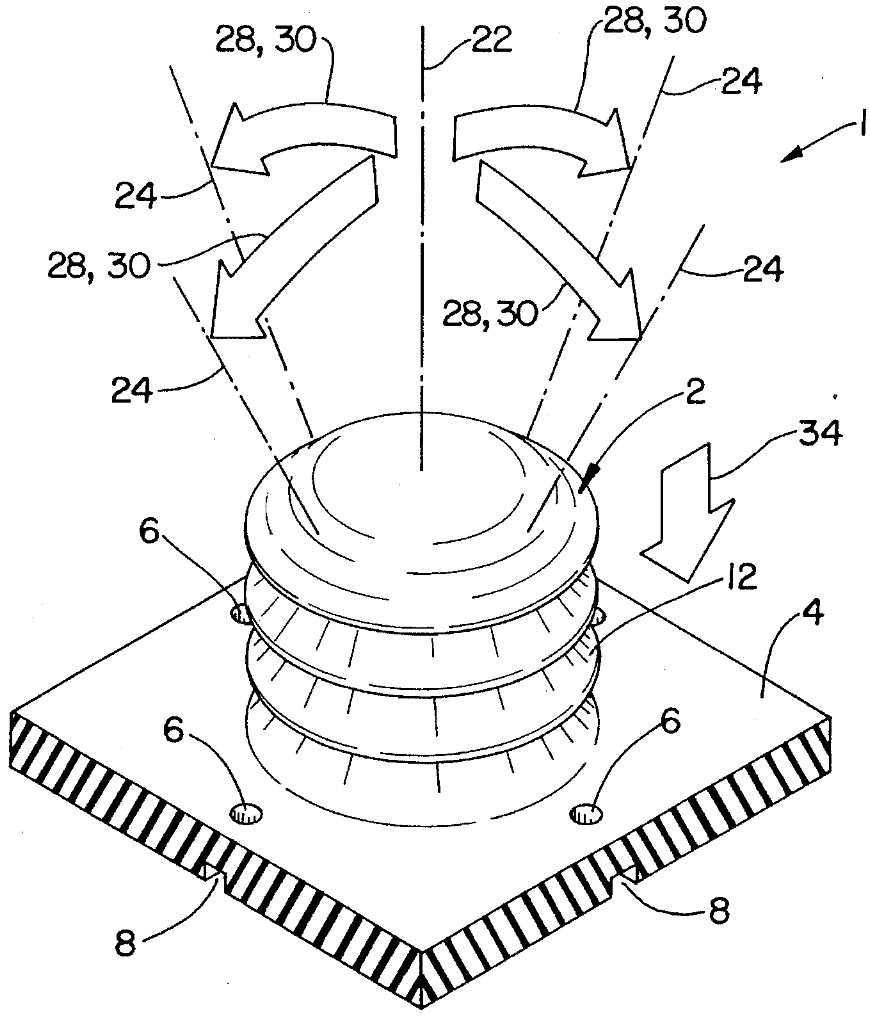
Figures 6B, 6C, 6D, 6E:
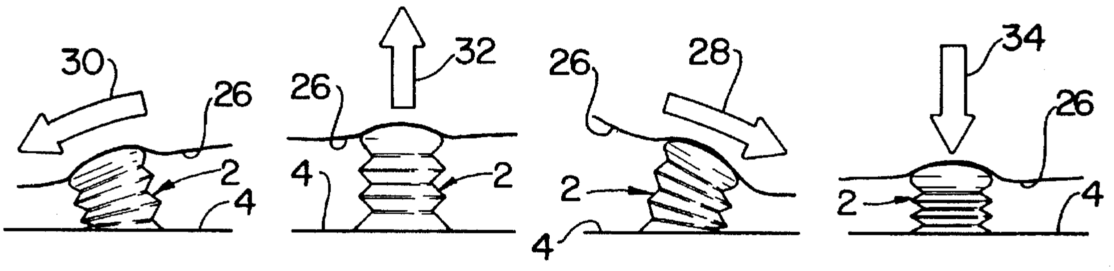

An acupressure massaging system 200 constructed in accordance with a third embodiment of the present invention is shown in FIG. 5. Acupressure massaging system 200 includes an array of nipples 2 formed in a recess area 15 in platform 4. Nipples 2 are recessed within the platform 4 with nipples 2 extending approximately one half of their length above upper surface 4A. A top open end 16 of each recess area 15 terminates at upper surface 4A, as shown in FIG. 5.

Referring to FIGS. 11 and 12, a fourth embodiment of the present invention is shown in which an acupressure massaging system 300 is very similar to that of acupressure massaging system 200 but includes a textured surface 62 on distal end 10 of nipples 2. Acupressure massaging system 300 is shown in FIGS. 11 and 12 as having been integrated into a golf club handle 60. Textured surface 62 is designed to promote a better grip on handle 60 while nipples 2 impart a massaging effect to the neural and acupressure points of hands 64 when swinging the club. In areas where the user grips firmly, textured surface 62 on nipples 2 provides a contoured grip to enhance grip control of the club when hitting a ball.

Acupressure massaging system 1 and nipples 2 are made using a conventional electronically controlled blow molding process which enables the thickness of side walls 12 to be varied during the manufacturing process. The thickness of walls 12 determines the function to be accomplished. For example, if nipples 2 are to be used directly on the skin of the user, walls 12 will be made with a thinner thickness than if walls 12 are to be used to massage the user through fabric and clothing. The thickness of walls 12 in cooperation with the elastic memory of the material from which walls 12 are made and the accordion-pleated structure of walls 12 determine the amount of massaging pressure exerted by the nipples. Walls 12 are preferably from about 0.0156 inch to about 0.125 inch thick.

Acupressure massaging system 1, nipples 2 and walls 12 are preferably made from plastic rubber, such as "Santoprene" thermoplastic rubber. "Santoprene" rubber consists of highly crosslinked rubber particles dispersed throughout a continuous matrix of thermoplastic material. An average rubber particle size of one micron or less results in very favorable physical properties. "Santoprene" rubber is processed on standard thermoplastic equipment. It can be blow molded with the efficiency and economy associated with thermoplastic materials. Polyethylene can also be used as the material for acupressure massaging system 1 and for nipples 2 and side walls 12.

It will be understood that each of the elements described above, or two or more together, may also find a useful application in other types of constructions differing from the type described above.

While the invention has been illustrated and described as embodied in an acupressure massaging system, it is not intended to be limited to the details shown, since it will be understood that various omissions, modifications, substitutions and changes in the forms and details of the device illustrated and in its operation can be made by those skilled in the art without departing in any way form the spirit of the present invention.

Without further analysis, the foregoing will so fully reveal the gist of the present invention that others can, by applying current knowledge, readily adapt it for various applications.

What is claimed is:

1. An acupressure massaging system, comprising:

a platform having an upper surface and a lower surface, said lower surface defining a plurality of intersecting air-flow channels and said upper surface defining a plurality of air-flow holes through said upper surface in air-flow communication with said air-flow channels and with space external of said system;

an array of spaced, independently flexible nipples extending from the upper surface of the platform, each said nipple having an upper distal end and a flexible, collapsible, accordion-pleated side wall defining an internal air-flow chamber, the air-flow chamber being in fluid communication with said air-flow channels and with said air-flow holes to enable air flow into and out of said air-flow chambers and said air-flow holes, and wherein said side wall of each said nipple is comprised of a material having an elastic memory, whereby compression and movement of the nipples is made possible by the collapsible, memory-containing side walls in cooperation with movement of air into and out of the air-flow chambers.

2. An acupressure massaging system as in claim 1 wherein said memory-containing material of said side walls is thermoplastic rubber.

3. An acupressure massaging system as in claim 1 wherein said memory-containing material of said side walls is polyethylene.

4. An acupressure massaging system as set forth in claim 1 further comprising a fabric material attached to the distal ends of the nipples to absorb moisture.

5. An acupressure massaging system as set forth in claim 1 further including a textured surface on the distal ends of the nipples to provide an increased grip with a contacting surface.

6. An acupressure massaging system as set forth in claim 1 wherein the platform further includes an array of recessed areas structured to contain the nipples therein and wherein each of said recessed areas defines a top open end terminating at the upper surface of the platform.

7. An acupressure massaging system as set forth in claim 4 wherein the platform further includes an array of recessed areas structured to contain the nipples therein and wherein each of said recessed areas defines a top open end terminating at the upper surface of the platform.

8. An acupressure massaging system as in claim 2 wherein said side walls have a thickness of from 0.0156 inch to 0.125 inch.

9. An acupressure massaging system as in claim 3 wherein said side walls have a thickness of from 0.0156 inch to 0.125 inch.

* * * * *